(No Model.)  2 Sheets—Sheet 1.
G. B. N. TOWER.
STEAM PUMP.
No. 270,515.  Patented Jan. 9, 1883.
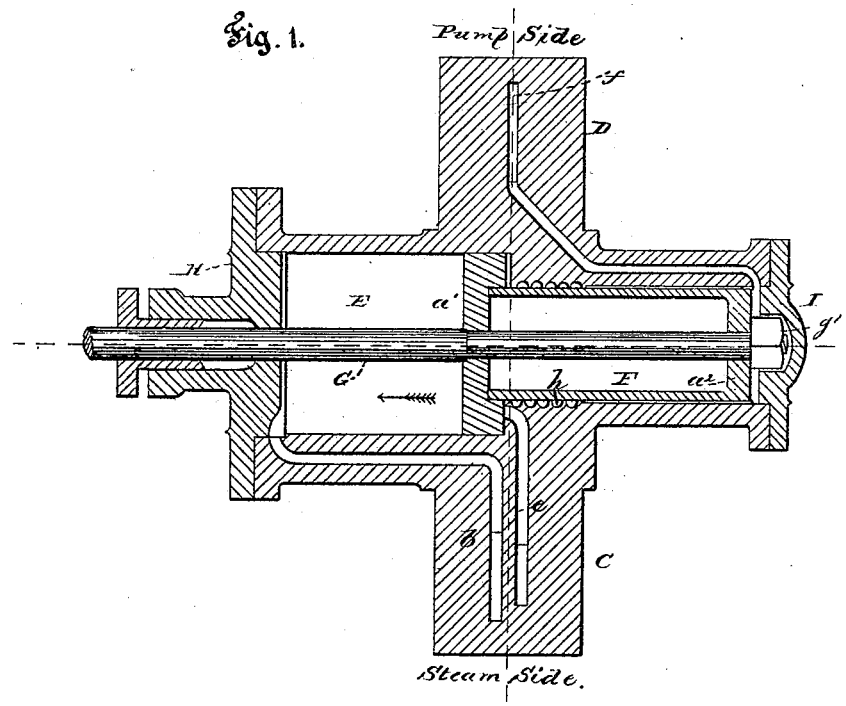
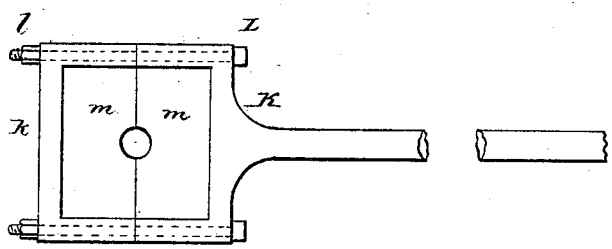
WITNESSES:
Fred. G. Dieterich
Wm. Hoffenter
INVENTOR.
George B. N. Tower,
by De Witt C. Allen
ATTORNEY.

(No Model.) 2 Sheets—Sheet 2.

G. B. N. TOWER.
STEAM PUMP.

No. 270,515. Patented Jan. 9, 1883.

WITNESSES:
Fred. G. Dieterich
Wm Holfenter

INVENTOR.
George B. N. Tower,
by De Witt C. Allen
ATTORNEY

UNITED STATES PATENT OFFICE.

GEORGE B. N. TOWER, OF NEW YORK, N. Y., ASSIGNOR OF ONE-HALF TO EDWARD L. LAMBIE, OF WASHINGTON, DISTRICT OF COLUMBIA.

STEAM-PUMP.

SPECIFICATION forming part of Letters Patent No. 270,515, dated January 9, 1883.

Application filed August 21, 1882. (No model.)

*To all whom it may concern:*

Be it known that I, GEORGE B. N. TOWER, a citizen of the United States, residing at New York city, in the county of New York and State of New York, have invented certain new and useful Improvements in Steam-Pumps; and I do hereby declare the following to be a full, clear, and exact description of the invention, such as will enable others skilled in the art to which it appertains to make and use the same.

This invention relates to certain new and useful improvements in pumps especially designed for use in connection with gases, steam, and hot liquids; and the invention has for its object the production of a pump in which a positive valve movement is obtained; and to this end the invention consists in novel features of construction and combination and arrangement of parts, all as will be hereinafter fully described, and set forth in the claims hereto annexed.

Figure 2:
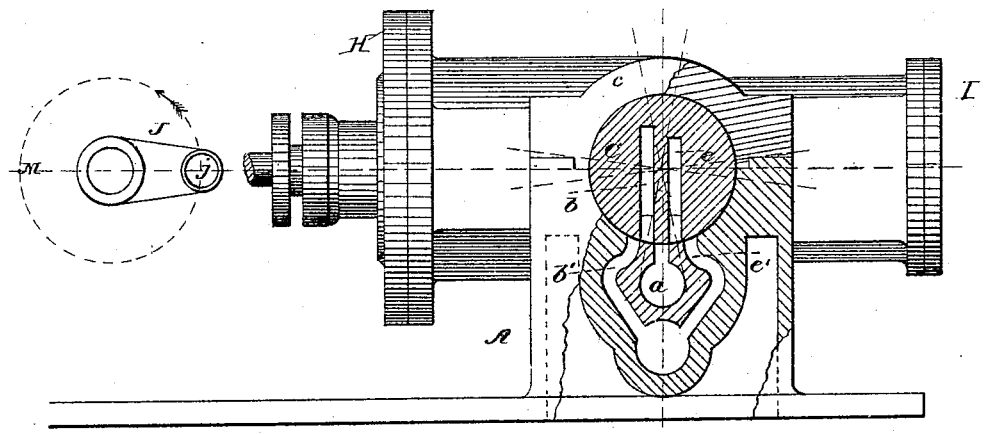
Figure 3:
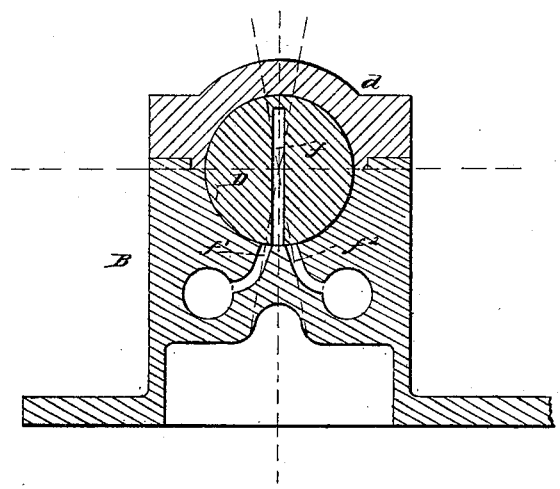

Referring to the accompanying drawings, Figure 1 represents a horizontal longitudinal section of my improved pump. Fig. 2 represents a partial longitudinal elevation with a portion of steam-side, trunnioned head, pedestal, and cap broken away to show the working of parts forming the positive valve-motion. Fig. 3 represents a vertical longitudinal section through the trunnioned head, cap, and pedestal on the pump side, showing its positive valve-motion; Fig. 4, detached view showing attachment of crank-pin to stub end of piston-rod.

In the drawings, A and B represent pedestals having bearing-boxes for the reception of the trunnioned heads C D, secured therein by the caps $c$ $d$. The trunnioned heads are cast integral with the steam and pump cylinders E and F, and arranged at right angles thereto, as shown in Fig. 1, forming central axial points for said cylinders in their vibrating or oscillating movements. Arranged respectively within said steam and pump cylinders are the steam-piston $a'$ and pump-plunger $a^2$, mounted upon the piston-rod G and secured thereon by the nut $g'$.

$h$ represents annular grooves on the interior of pump-cylinders to form packing for the pump-plunger.

H and I represent the heads for the steam and pump cylinders, and J the crank, the pin $j$ of which is connected to the piston-rod as follows:

K represents stub end of piston-rod, connected to the cap $k$ by bolts and nuts L $l$, and between which cap and stub end of piston-rod is arranged the half-sectional brasses $m$ $m$, through which the crank-pin passes, as clearly shown in detail, Fig. 4.

$b$ represents main steam-cylinder port and passage in trunnioned head C, and $b'$ corresponding exhaust-passage in pedestal A; and $e$, steam-cylinder port and passage in trunnioned head C, and $e'$ corresponding exhaust-passage in pedestal A.

$f$ represents pump-cylinder port and passage in trunnioned head D, and $f'$ corresponding exhaust-passage, and $f^2$ corresponding supply-passage, both in pedestal B.

The operation of my improved steam-pump is as follows: The crank J, being rotated in the direction of arrow, (see Fig. 2,) vibrates or oscillates the trunnioned heads C and D, and opens the steam ports and passages $e$ and $a$, permitting the steam to pass into the annular space between pump-plunger $a^2$ and steam-cylinder in front of steam-piston $a^2$, driving it along in the direction of arrow, (see Fig. 1,) and carrying with it the pump-plunger $a^2$, while at the same time forming a connection, respectively, between the ports and passages $f$ and $f^2$ in the trunnioned head and pedestal of the pump, permitting the liquid to pass into the pump-cylinder F. When the crank J reaches the point M in its rotation, (see Fig. 2,) the port and passage $e$ is closed to steam-port $a$, and opens to the steam port and passage $e'$, allowing the steam to exhaust, while the port and passage $b$ is opened to the steam-port $a$, allowing steam to enter the cylinder E and drive the piston back again, and carrying pump-plunger with it, and forcing the contents of pump-cylinder through the connecting ports and passages $f$ and $f'$ to the discharge-pipe. At the end of the return-stroke of piston $a'$ the ports and passages $b$ $b'$ will open to each other, permitting steam to exhaust.

It will thus be perceived that by my improved construction of pump a positive valve motion is produced without the aid of auxiliary valves, caused by the trunnioned heads forming in themselves the necessary valves due to the simultaneous movements of the cylinders and heads.

All parts of the steam-pump may be or are formed of cast-iron, which can be easily and readily fitted together, thus forming a cheap, durable, and effective pump.

Having thus fully described my invention, what I claim as new, and desire to secure by Letters Patent, is—

1. In a steam-pump, the combination of trunnioned steam and water cylinders having inlet and outlet ports adapted to register with corresponding ports for admitting and exhausting steam and admitting and discharging water from them, respectively, and a piston-rod for communicating oscillating movements thereto, provided with the steam-piston and pump-plunger, substantially as and for the purpose specified.

2. The combination of the steam and water cylinders having trunnioned heads arranged at right angles thereto and on opposite sides thereof, and provided with inlet and outlet ports, adapted to register with corresponding ports for admitting and exhausting steam and admitting and discharging water from them, respectively, and a piston-rod having mounted thereon the steam-piston and pump-plunger, substantially in the manner as and for the purpose specified.

3. The combination of the steam and water cylinders having trunnioned heads arranged at right angles thereto and on opposite sides thereof, and provided with inlet and outlet ports adapted to register with corresponding ports for admitting and exhausting steam and admitting and discharging water from them, respectively, pedestals in which said heads are mounted, having supply and discharge passages, and the piston-rod for oscillating said cylinders, having the steam-piston and pump-plunger mounted thereon, substantially as and for the purpose herein shown and described.

In testimony whereof I affix my signature in presence of two witnesses.

GEORGE B. N. TOWER.

Witnesses:
  E. L. LAMBIE,
  ANTOINETTE H. LAMBIE.